(12) United States Patent
McDonald et al.

(10) Patent No.: US 11,637,719 B2
(45) Date of Patent: Apr. 25, 2023

(54) CO-PACKAGED MULTIPLANE NETWORKS

(71) Applicant: HEWLETT PACKARD ENTERPRISE DEVELOPMENT LP, Houston, TX (US)

(72) Inventors: Nicholas McDonald, Fort Collins, CO (US); Gary Gostin, Plano, TX (US); Alan Davis, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/047,833

(22) PCT Filed: Apr. 30, 2018

(86) PCT No.: PCT/US2018/030111
§ 371 (c)(1),
(2) Date: Oct. 15, 2020

(87) PCT Pub. No.: WO2019/212461
PCT Pub. Date: Nov. 7, 2019

(65) Prior Publication Data
US 2021/0167992 A1      Jun. 3, 2021

(51) Int. Cl.
*H04L 12/28* (2006.01)
*H04L 12/42* (2006.01)
(Continued)

(52) U.S. Cl.
CPC ............ *H04L 12/42* (2013.01); *H04L 12/403* (2013.01); *H04L 41/12* (2013.01); *H04L 2012/421* (2013.01)

(58) Field of Classification Search
CPC ....... H04L 12/42; H04L 12/403; H04L 41/12; H04L 2012/421
See application file for complete search history.

(56) References Cited

U.S. PATENT DOCUMENTS 7,769,255 B2    8/2010   Nagy et al.
7,894,722 B2    2/2011   Barbarossa
(Continued)

FOREIGN PATENT DOCUMENTS

CN    103221940 A    7/2013
CN    103221940 A    7/2013
(Continued)

OTHER PUBLICATIONS

International Search Report and Written Opinion received for PCT Application No. PCT/US2018/030111, dated Jan. 28, 2019, 16 pages.
(Continued)

*Primary Examiner* — Abdelnabi O Musa
(74) *Attorney, Agent, or Firm* — Hewlett Packard Enterprise Patent Department

(57) ABSTRACT

A co-packaged, multiplane network includes: an enclosure; a portion of a first network plane disposed within the enclosure and comprising a first plurality of interconnected switches; a portion of a second network plane disposed within the enclosure and comprising a second plurality of interconnected switches, the second network plane being independent of the first network plane and having the same topology as the first network plane; and a plurality of connectors, each connector being communicatively coupled to a respective port of each of the first plurality of interconnected switches and the second plurality of interconnected switches.

15 Claims, 4 Drawing Sheets

(51) Int. Cl.
*H04L 12/403* (2006.01)
*H04L 41/12* (2022.01)

(56) References Cited

U.S. PATENT DOCUMENTS

| | | | |
|---|---|---|---|
| 9,225,666 B1 | 12/2015 | Aybay | |
| 10,185,691 B2* | 1/2019 | Hua | G06F 1/16 |
| 11,196,683 B2* | 12/2021 | Yao | H05K 7/1492 |
| 2002/0044319 A1* | 4/2002 | Kashima | H04Q 11/0005 398/45 |
| 2003/0030988 A1* | 2/2003 | Garnett | H04L 63/083 361/724 |
| 2007/0110088 A1* | 5/2007 | Kemp | H04L 49/1515 370/419 |
| 2007/0217405 A1* | 9/2007 | Beshai | H04Q 11/0005 370/375 |
| 2008/0151863 A1* | 6/2008 | Lawrence | H04L 49/15 370/351 |
| 2008/0275975 A1* | 11/2008 | Pandey | H04L 49/40 709/223 |
| 2011/0262135 A1 | 10/2011 | Boduch et al. | |
| 2012/0195319 A1 | 8/2012 | Bragg et al. | |
| 2015/0372838 A1* | 12/2015 | Toilion | H04L 12/40169 370/254 |
| 2016/0218930 A1* | 7/2016 | Toilion | H04L 12/44 |
| 2017/0063631 A1 | 3/2017 | Curtis et al. | |
| 2018/0123717 A1* | 5/2018 | Luo | H04J 3/0638 |
| 2019/0089650 A1* | 3/2019 | Leung | H04L 49/15 |

FOREIGN PATENT DOCUMENTS

| | | |
|---|---|---|
| CN | 104798352 A | 7/2015 |
| CN | 104798352 A | 7/2015 |
| CN | 104871495 A | 8/2015 |
| CN | 104871495 A | 8/2015 |
| WO | WO-2016149797 A1 | 9/2016 |

OTHER PUBLICATIONS

Falta, K., "Optical Switching Sparks Demand for MEMS," Jan. 3, 2001, http://www.electronicproducts.com/Optoelectronics/Optical_switching_sparks_demand_for_MEMS.aspx.

* cited by examiner

CO-PACKAGED MULTIPLANE NETWORKS

BACKGROUND

Networks frequently include many network components such as network interfaces, switches, routers, etc. The network components receive and generally include a number of interconnected device components that interact with each other and with other network components. The electrical signals of the device components in these components are commonly routed to the edge of an enclosure, which is frequently a chassis, and presented in a "cage". A cage is an empty connector where different types of connectors can be placed in them. Cables are then run between the network components to establish their interconnectivity.

BRIEF DESCRIPTION OF THE DRAWINGS

Examples described herein may be understood by reference to the following description taken in conjunction with the accompanying drawings, in which like reference numerals identity like elements.

While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives failing within the spirit and scope of the examples described herein and the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions will be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As computing systems become more complex and the demand on their resources intensifies, so has the size, complexity, and cost of the networks being used. Some of these cables that establish interconnectivity between network components are strictly passive and connect to the electrical signals directly. Others have optical transceivers built into the connector. In today's world, the passive electrical cables are about 3 meters long and cables lengths longer than that use active optical cables ("AOCs") which are an order of magnitude more expensive. In today's large-scale interconnection networks, the cost of the cables throughout the system can dominate the total cost.

For systems that demand large amounts of bandwidth, people resort to connecting a single "node" to multiple network connection points. There are two ways this can be accomplished. First, a network can be built twice as large to handle the nodes connecting twice to the network (i.e., 16 k network endpoints for 8 k bi-connected nodes). The other way is to create two distinct networks and connect each node to each network (two 8 k networks for 8 k dual connected nodes). The cost of network topologies grows in a super-linear fashion which means that a 16 k network is more than twice the cost of an 8 k network. Thus, the second option (two distinct networks) for doubling bandwidth is more cost efficient.

Figure 1:
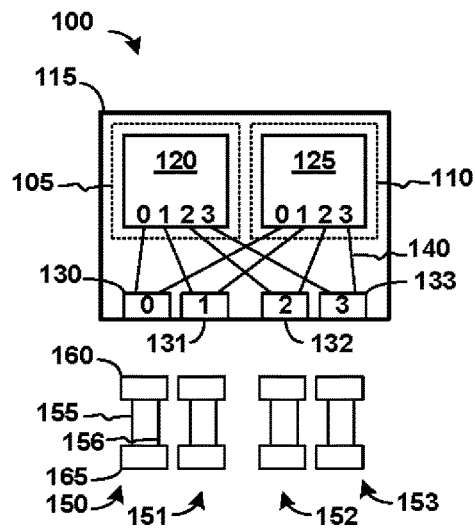
FIG. 1 conceptually illustrates a particular embodiment of the subject matter claimed below.

The present disclosure presents an approach to co-packaging multiplane networks in a manner that reduces cabling demands and costs, one embodiment of which is conceptually shown in FIG. 1. The co-packaged, multiplane network 100 includes first and second network planes 105, 110 disposed within an enclosure 115. The network planes 105, 110 are "disposed within the enclosure" 115 in the sense that they are located and positioned within the enclosure 115. The manner in which the networks planes 105, 110 are located and positioned within the enclosure 115 is not material.

A "network plane" for present purposes is a set of interconnected switches with no interconnection to any other switch. So, if a switch is interconnected with another switch but not any third switch, then those two interconnected switches define a "network plane". If the two switches are interconnected to a third switch as well as each other, then the three switches define a network plane. For example, in FIG. 1, each network plane 105, 110 includes a single switch 120, 125, respectively, and the switches 120, 125 are not interconnected. Each of the switches therefore defines a separate network plane relative to one another. This also means that, in this particular embodiment, the entire network planes 120,125 are located within the enclosure 115.

However, the subject matter claimed below is not so limited. Many network planes will have many switches. By definition, within the network plane each of these switches will be interconnected. Also by definition, none of the switches in one network plane will be interconnected with any switch of another network plane. In these embodiments, it is not necessary for the entirety of the network planes to be disposed within the same enclosure. In these embodiments, at least a portion of each of the network planes is disposed within the same enclosure. Note that, in these embodiments, the network planes will have the same topology (e.g., the same number of switches interconnected in the same configuration). Furthermore, the portions of the network planes disposed within any given enclosure will be the corresponding portions of that same topology. At least one such embodiment is disclosed below.

Returning to FIG. 1, the enclosure 115 may be any type of enclosure known to be suitable for this purpose. For example, a chassis may be used. The network planes 105, 110 may also be disposed within the enclosure 115 in any suitable manner known to the art. For example, they may be mounted on a board (not shown) having flanges on either side that then mate with a groove defined by the enclosure 115 as the board is inserted into the enclosure 115. Again, however, the manner in which the network planes 105, 110 are mounted and positioned within the enclosure 115 is not material so long as the network planes 105, 110 are disposed within the enclosure 115.

In this particular embodiment, each network plane 105, 110 comprises a single switch 120, 125. Note, however, alternative embodiments may employ network planes comprised of any number of switches. The switches 120, 125 may comprise application specific integrated circuits ("ASICs"). The switches 120, 125 include a first plurality of ports and a second plurality of ports, the number of ports in each plurality being equal. In this embodiment, each of the switches 120, 125 has four ports 0-3.

The network planes 105, 110 are "independent" of one another, meaning that there are no electrical or optical interconnects between the two of them. Thus, there are no plane to plane connections. The network planes 105, 110 also share the same topology. In the present context, "same topology" means the network planes 105, 110 have equal numbers of switches interconnected in the same way, the switches having equal numbers of ports. Since each network plane 105, 110 comprises only a single switch, the network planes 105, 110 will have the same topology. However, in embodiments wherein network planes comprise multiple switches, this characteristic will also hold true.

The co-packaged, multiplane network 100 also includes a plurality of connectors 130-133 mounted to the enclosure 115. The connectors 130-133 may be mounted to the enclosure 115 in any suitable manner known to the art. For example, they may be mounted to the enclosure 115 as a part of a cage (not shown) as described above. Each connector 130-133 is communicatively coupled to a respective port 0-3 of each of the switches 120, 125. Since each of the switches 120, 125 has four ports 0-3, there are four connectors 130-133. The connector 130 is communicatively coupled to the port 0 of each of the switches 120, 125. The connector 131 is communicatively coupled to the port 1 of the switches 120, 120, 125. Similarly, the connectors 132, 133 are communicatively coupled to their respective ports 2, 3 of the switches 120, 125 as shown.

The connectors 130-133 are communicatively coupled to their respective ports 0-3 over lines 140, only one of which is indicated by a reference numeral in FIG. 1. In this particular embodiment, the lines 140 are optical fibers or cables. However, alternative embodiments may use, for example, electrical cables or traces on a printed circuit board ("PCB"). The lines 140 may be active or passive, depending on the implementation, and may employ both electrical and optical technologies. For example, there are electrical cables known to the art that include optical transceivers in one or both of the connectors.

This approach greatly reduces the number of cables used for interconnection with other network components relative to conventional practice. There are only four connectors 130-133 because there are four ports 0-3 in each switch 120, 125 and because there is only one switch 120, 125 per network plane 105, 110. Because there are four connectors 130-133, only four cables are used 150-153—one for each port 0-3 of the switches 120, 125 for interconnection with other network components. In conventional practice, on the other hand, in co-packaged network planes each network plane is connected to a node using a separate set of cables, one cable for each port on each switch for each network plane.

Each cable 150-153 includes two lines 155, 156—one for the switches 120, 125 in each of the network planes 105, 110. The lines 155, 156 in the illustrated embodiment are optical fibers such that the cables 150-153 are optical cables.

The cable end connectors 160, 165, for each of the cables 150-153 are, accordingly, any suitable connector known in the art for optical connections. Note that only one of each cable end connectors 160, 165 and lines 155, 156 are referenced by number in FIG. 1. However, alternative embodiments may use, for example, electrical lines or some other suitable technology.

Thus, the number of connectors 130-133 and the number of external cables 150-153 are equal to the number of ports 0-3 in the switches 120, 125. This means that the number of connectors 130-133 is independent of the number of network planes 105, 110. Furthermore, the number of lines 155, 156 in each cable 150-153 is equal to the number of network planes 105, 110.

Figure 2:
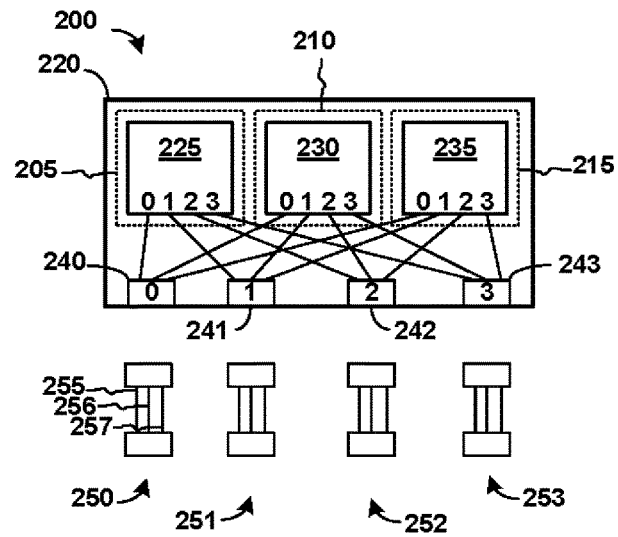
FIG. 2 conceptually illustrates a particular embodiment in which the number of network planes is scale upwardly.

FIG. 2 depicts an embodiment in which more than two network planes are present in the enclosure to illustrate how this approach scales with the number of network planes. More particularly, FIG. 2 conceptually illustrates a co-packaged, mutiplane network 200 including three independent network planes 205, 210, 215, each having the same topology. Each is disposed within an enclosure 220. Each network plane 205, 210, 215 comprises a respective switch 225, 230, 235. Each switch 225, 230, 235 includes a plurality of ports 0-3.

The co-packaged, multiplane network 200 also includes a plurality of connectors 240-243. Each connector 240-243 is communicatively coupled to a respective port 0-3 of each of the switches 205, 210, 215 as shown. Note that there are four ports 0-3 for each switch 205, 210, 215 such that the number of connectors 240-243 is independent of the number of network planes 225, 230, 235 in the enclosure 220. Each external cable 250-253 includes three cabled lines 255-257 one for each of the network planes 225, 230, 235. The lines 255-257 are, again, optical but may be electrical in alternative embodiments.

Figure 3:
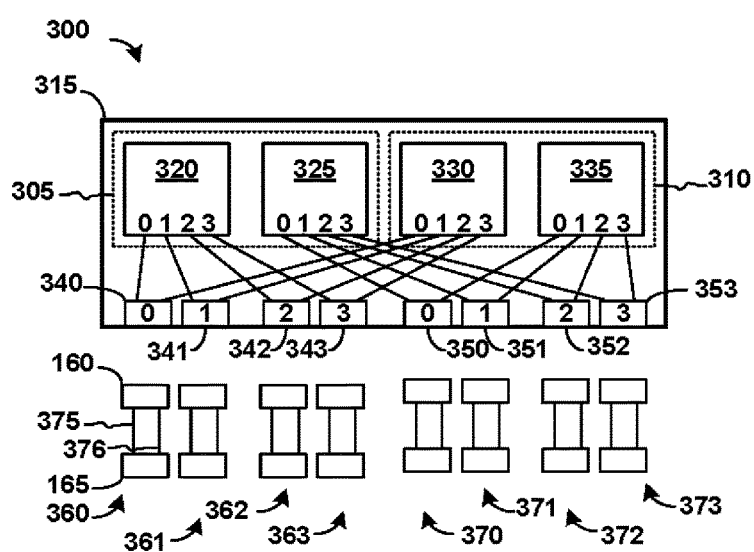
FIG. 3 conceptually illustrates a particular embodiment in which the number of switches per network plane is scaled upwardly.

The approach also scales with the number of switches per network plane as illustrated in FIG. 3. The co-packaged, multiplane network 300 includes two independent network planes 305, 310, which have the same topology, disposed within the enclosure 315. The network plane 305 includes a first switch 320 and a second switch 325. The network plane 310 includes a third switch 330 and a fourth switch 335. Each of the switches 320, 325, 330, and 335 includes four ports 0-3.

The co-packaged, multiplane network 300 also contains two pluralities of connectors 340-343 and 350-353, one set for each of the switches in each of the network planes 305, 310. Each of the ports 0-3 for the first switch 320 and the third switch 330 are communicatively coupled to the connectors 340-343 as described above. Each of the ports 0-3 of the second switch 325 and the fourth switch 335 are communicatively coupled to the connectors 350-353 as described above.

Thus, while the number of connectors 340-343 and 350-353 are independent of the number of network planes, they are dependent on the number switches per network plane. In embodiments where there are three switches per network plane, then there will be three pluralities of connectors as a general rule. However, this relationship is not strictly maintained in all embodiments as will be discussed further below.

Furthermore, there are two pluralities of cables now, the cables 360-363 and 370-373, one plurality of cables 360-363 and 370-373 for each of the pluralities of connectors 340-343 and 350-353. As discussed above, the number of lines per cable in the cables 360-363 and 370-373 is a function of the number of network planes 305, 310 represented in the enclosure 315. Since there are two network planes 305, 310, each of the cables 360-363 and 370-373 includes two lines 375, 376. Again, the lines 375, 375 are optical but alternative embodiments may use electrical cables instead.

Figure 4:
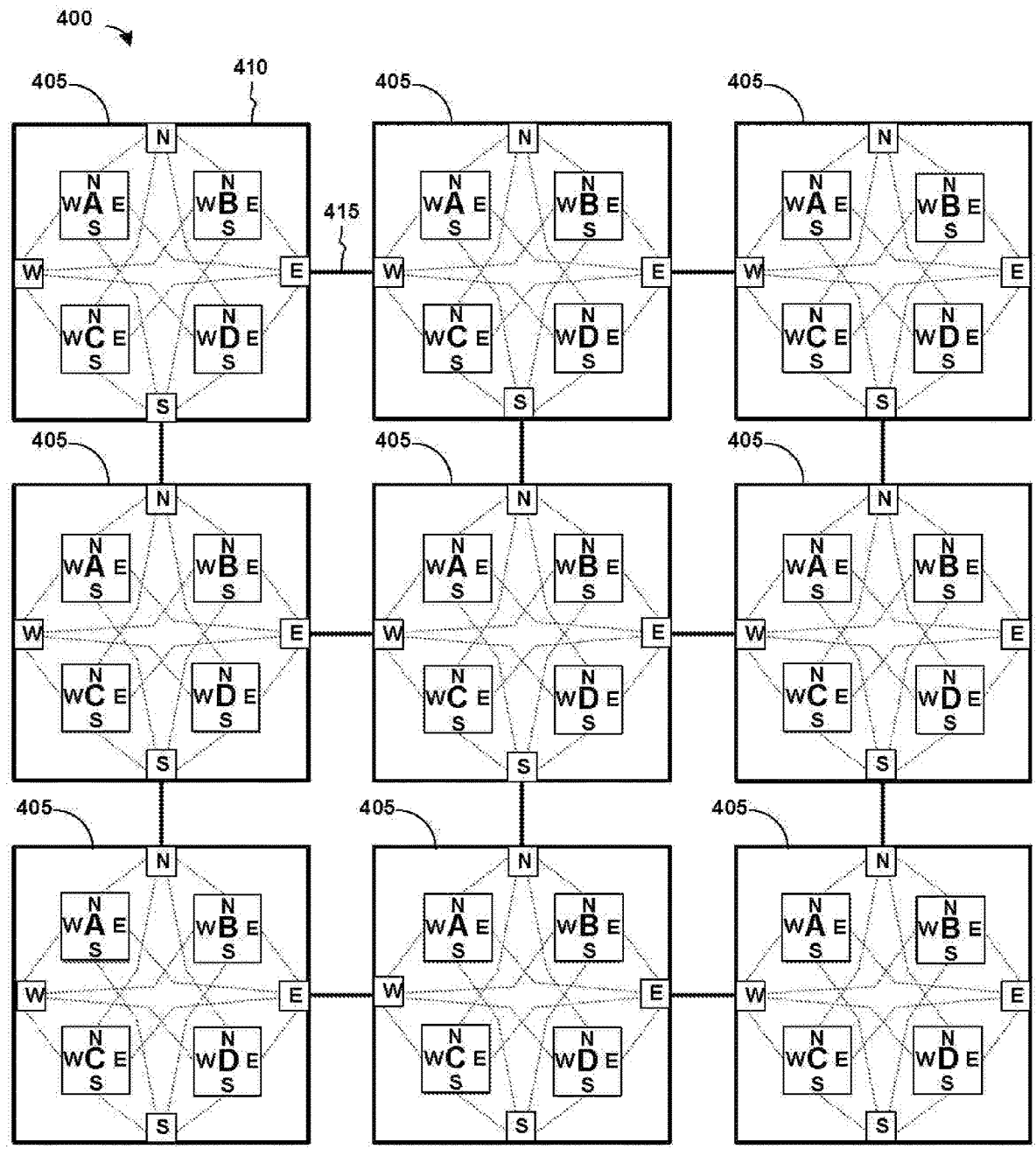
FIG. 4 illustrated one particular embodiment in which the subject matter claimed below is deployed in a mesh network.

FIG. 4 shows a mesh network 400. In the mesh network 400, there are four network planes designated network plane A, network plane B, network plane C, and network plane D. These network planes A-D are, as described above, independent and have the same topology. They are distributed through the nodes 405—each defined by an enclosure 410 (only one indicated) such that each node 405 contains a respective switch A-D from each of the network planes A-D. That is, at least a portion of each of the network planes A-D is disposed within each of the enclosures 410.

Each of the switches A-D includes four ports N ("North"), S ("South"), E ("East"), and W ("West"). As there is a single switch from each of the network planes A-D, there is a single plurality of connectors ports N ("North"), S ("South"), E ("East"), and W ("West"). Each of the N ports of the switches A-D is communicatively coupled to the respective N connectors, and the same holds true for the S ports and S connectors, the E ports and the E connectors, and the W ports and the W connectors. And, since there are four network planes A-D represented within the enclosure 410 of the node, the external cables 415 (only one indicated) will each contain four lines (not shown) as described above.

Accordingly, the mesh network 400 is a two-dimensional ("2D") 3×3 array of nodes 405 with four network planes A-D, with 9 switches per network plane implemented using 36 ASICs. While FIG. 4 is shown with 3×3 arrays, the application of co-packaging as described herein is not limited to 3×3 mesh arrays, and that it could be used in a 2×2 array (not shown) or 4×4 arrays (also not shown), for example. It also is not limited to a 2D network. It could be implemented in a one-dimensional mesh network (not shown) implemented using, for example, a string of routers.

Figure 5:
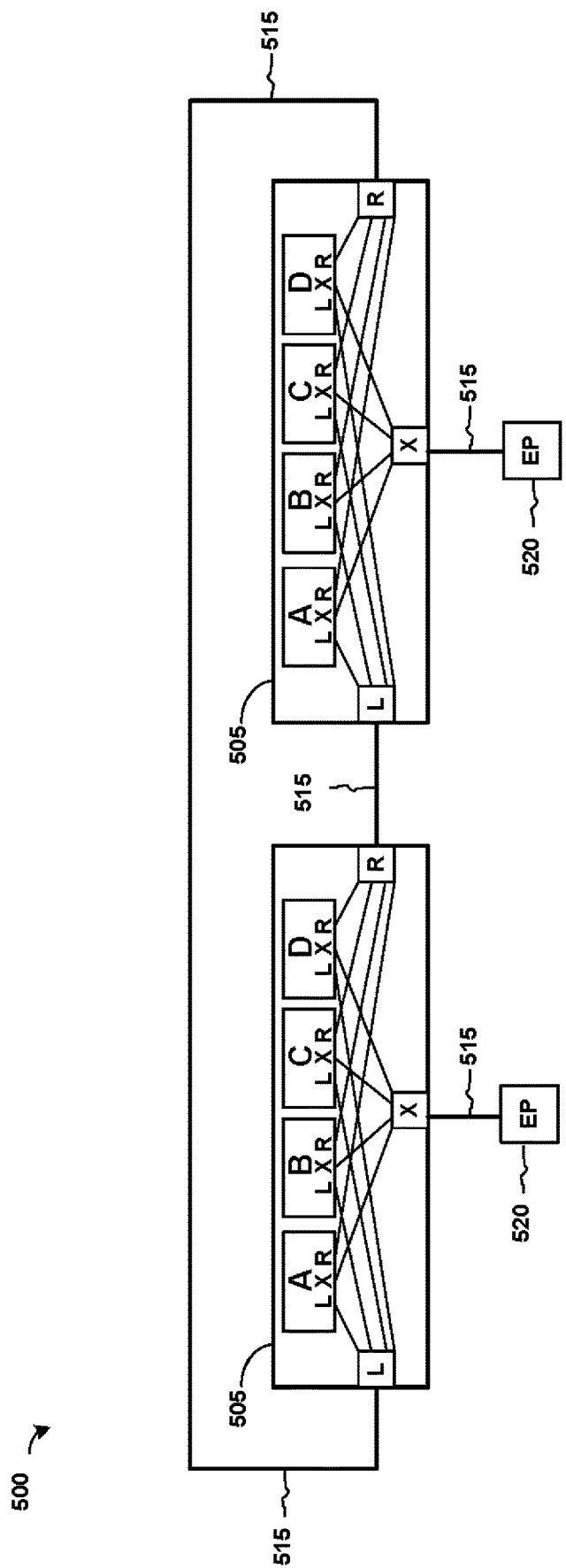
FIG. 5 illustrated one particular embodiment in which the subject matter claimed below is deployed in a ring network.

The approach disclosed herein may also be deployed in other types of network topologies. For example, the network 500 in FIG. 5, has a ring topology. There are four network planes A-D, again, with one switch A-D from each network plane A-D being disposed within the enclosures 505. Each of the switches A-D has three ports L, X, and R and, accordingly, each enclosure 505 includes three connectors L, X, and R. The L ports of the switches A-D are communicatively coupled to the L connectors, the X ports are communicatively coupled to the X connectors, and the R ports are communicatively coupled to the R connectors as shown. Since there is one switch per plane, there is only one plurality of connectors L, X, and R. Finally, because there are four network planes A-D in each enclosure 505, each external cable 515, both between the enclosures 505 and between the enclosures 505 and the endpoints 520, will each include four lines as discussed above.

Figure 6:
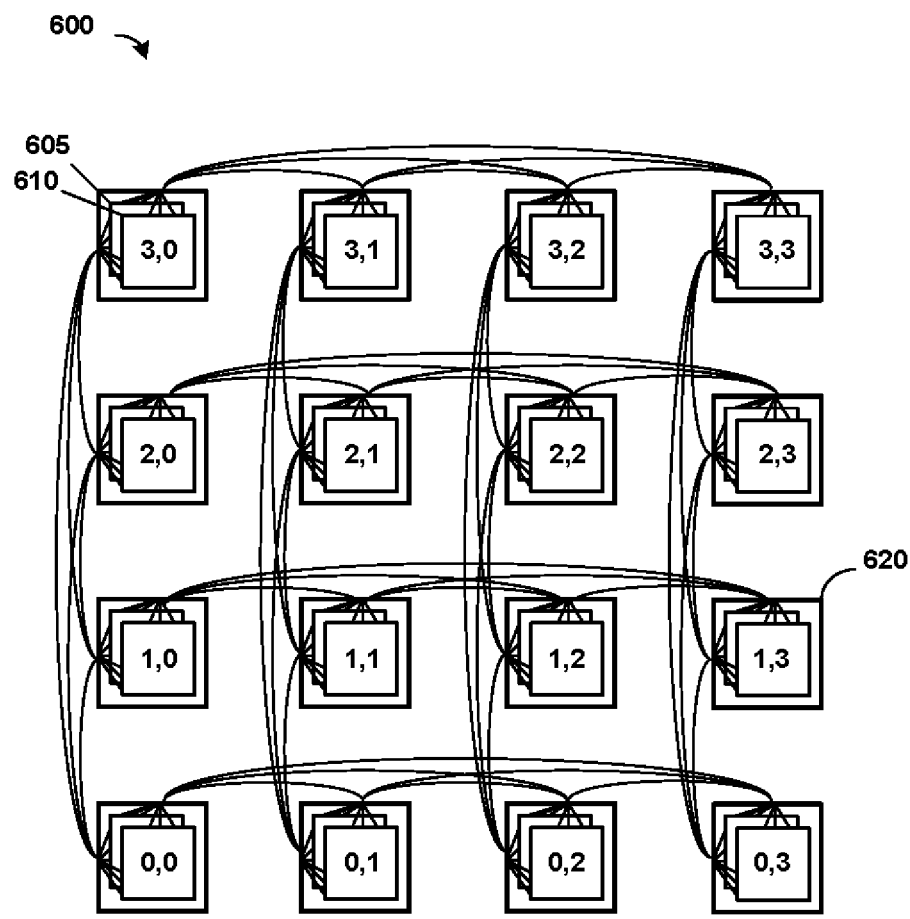
FIG. 6 conceptually illustrates one particular embodiment in which the subject matter claimed below is deployed in a Hyper X network.

Mesh and ring topologies are typically used in small-scale networks. However, the claimed subject matter may also be used in large scale networks as well. FIG. 6 illustrates a two-dimensional, 4×4 Hyper X network 600. There are two network planes 605, 610, with the network plane 610 shown on "top" of the network plane 605. FIG. 6 illustrates a conceptual depiction. Each point 0,0-3,3 in the network plane 605 is interconnected with every other point 0,0-3,3. Similarly, each point 0,0-3,3 in the network plane 610 is interconnected with every other point 0,0-3,3. But no point 0,0-3,3 in the network plane 605 is interconnected with any point 0,0-3,3 in the network plane 610 and vice versa. Hence, the network planes 605, 610 definitionally are separate network planes as discussed above.

Each point 0,0-3,3 in each network plane 605, 610 is co-packaged with the corresponding point 0,0-3,3 in the other network plane 605, 610 since both network planes 605, 610 have the same topology. So, for example, the point 0,3 in the network plane 605 is co-packaged with the point 0,3 in the network plane 610. This is true throughout both the network planes 605, 610. Thus, note that only a portion of each network plane 605, 610 is disposed within any given enclosure 620 (only one indicated). This holds true as well for the networks 400, 500 in FIG. 4 and FIG. 5, respectively.

In each of the networking contexts of FIG. 4 and FIG. 6, all of the network planes are completely co-packaged throughout the network. That is, each switch of each network plane is co-packaged with at least one switch of each other network plane. This may not be the case in all embodiments. In some embodiments, one or more of the network planes in the network may be omitted from the co-packaging. In other embodiments, one or more switches within the network plane may be co-packaged while others are not. And in still other embodiments, these two variations may be practiced together.

As noted above, there may be exceptions wherein the number of connectors is not directly related to the number of switches. Because some embodiments may employ multiple switches from a single network plane within the same enclosure, the interconnection between these switches need not necessarily leave the chassis. These interconnections may instead be made entirely within the enclosure. Thus, in these contexts, some connectors may be omitted from the enclosure.

Thus, in general, this disclosure presents a co-packaged, multiplane network comprising an enclosure, a first network plane, a second network plane, and a plurality of connectors. The first network plane is disposed at least in part within the enclosure and comprises a first plurality of interconnected switches. The second network is also disposed at least in part within the enclosure and comprises a second plurality of interconnected switches. The second network plane is independent of the first network plane and has the same topology as the first network plane. Each connector is communicatively coupled to a respective port of each of the first and second switches.

In a larger networking context, a co-packaged, multiplane network comprises a plurality of enclosures, a plurality of network planes, and a plurality of cables. Each network plane is independent of the other network planes, has the same topology as the other network planes, and is at least partially disposed within each of the enclosures. The cables interconnect each of the enclosures. The number of cables in each interconnection is a function of the number of ports per switch and the number of switches per plane disposed in each of the enclosures.

This concludes the detailed description. The particular embodiments disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the appended claims. Accordingly, the protection sought herein is as set forth in the claims below.

What is claimed is:

1. A co-packaged, multiplane network comprising:
an enclosure which is a network chassis presented in a cage;
a plurality of network planes residing in the enclosure, wherein a respective network plane comprises a same number of interconnected switches, each switch having a same number of ports and comprising application specific integrated circuits (ASICs);
wherein switches within each network plane are interconnected based on a same topology, and
wherein the network planes are independent from and not interconnected with one another within the enclosure; and
a number of connectors attached to the enclosure, wherein each connector is coupled to a corresponding port of one switch from each network plane, wherein the number of connectors equals the number of ports per switch times the number of network planes in the enclosure, wherein each connector is coupled to a cable comprising a plurality of lines, and wherein a total number of lines in the cable equals the number of network planes, thereby facilitating of reduction of cables coupled to the network chassis.

2. The co-packaged, multiplane network of claim 1, comprising a portion of a first network plane residing within the enclosure and a portion of a second network planed residing with the enclosure, wherein each portion includes two switches.

3. The co-packaged, multiplane network of claim 2, further comprising a portion of a third network plane residing within the enclosure, the third network plane being independent of the first network plane and the second network plane and having the same topology as the first network plane and the second network plane, the third network plane comprising a third plurality of interconnected switches, wherein each connector is communicatively coupled to a respective port of the third plurality of interconnected switches.

4. The co-packaged, multiplane network of claim 1, wherein each connector is communicatively coupled to the corresponding port of one switch from each network plane using optical cables, electrical cables, or printed circuit board traces.

5. The co-packaged, multiplane network of claim 1, wherein the network is a part of a mesh network or a ring network.

6. A co-packaged, multiplane network comprising:
an enclosure which is a network chassis presented in a cage;
a first network plane residing in the enclosure and comprising a first switch;
a second network plane residing in the enclosure and comprising a second switch, wherein the first switch and second switch have a same number of ports and comprise application specific integrated circuits (ASICs), wherein the first network plane and second network plane each have a same topology, and wherein the network planes are independent from and not interconnected with one another within the enclosure; and
a number of connectors attached to the enclosure, wherein each connector is coupled to a corresponding port of one switch from each network plane, wherein the number of connectors equals the number of ports per switch times the number of network planes in the enclosure, wherein each connector is coupled to a cable comprising a plurality of lines, and wherein a total number of lines in the cable equals the number of network planes, thereby facilitating reduction of cables coupled to the network chassis.

7. The co-packaged, multiplane network of claim 6, further comprising a portion of a third network plane residing within enclosure, the third network plane being independent of the first network plane and the second network plane and having the same topology as the first network plane and the second network plane, the third network plane comprising a third switch, the third switch including the same number of ports as the first switch and second switch, and wherein each of the connectors is communicatively coupled to a respective port of the third switch.

8. The co-packaged, multiplane network of claim 6, wherein the first network plane further comprises a third switch including a third plurality of ports and the second network plane further comprises a fourth switch including a fourth plurality of ports, the number of ports in the third switch and fourth switch being equal to the number of ports and the second in the first switch and second switch; and
wherein each of the connectors is communicatively coupled to a respective port of the third and fourth switches.

9. The co-packaged, multiplane network of claim 6, wherein the connectors are communicatively coupled to the respective ports of the first switch and the second switch using optical cables, electrical cables, or printed circuit board traces.

10. The co-packaged, multiplane network of claim 6, wherein the network is a part of a mesh network or a ring network.

11. A co-packaged, multiplane network comprising:
a plurality of enclosures with each enclosure being a network chassis presented in a cage;
a number of network planes residing in each enclosure, wherein a respective network plane comprises a same number of interconnected switches, each switch having a same number of ports and comprising application specific integrated circuits (ASICs);
wherein switches within each network plane are interconnected based on a same topology, and
wherein the network planes are independent from and not interconnected with one another within the enclosure;
a number of connectors attached to the enclosure, wherein each connector is coupled to a corresponding port of one switch from each network plane, and wherein the number of connectors equals the number of ports per switch times the number of network planes in the enclosure; and
a number of cables interconnecting each of the enclosures, wherein the number of cables in each interconnection being a function of the number of ports per switch and the number of switches per plane disposed in each of the enclosures, wherein each cable comprises a plurality of lines and is coupled to one connector, and wherein a total number of lines in the cable equals the number of network planes, thereby facilitating reduction of cables interconnecting the enclosures.

12. The co-packaged, multiplane network of claim 11, further comprising a network plane that is not co-packaged with the network planes.

13. The co-packaged, multiplane network of claim 11, wherein a portion of each network plane residing within the enclosures comprises multiple interconnected switches.

14. The co-packaged, multiplane network of claim 11, wherein the connectors are communicatively coupled using optical cables, electrical cables, or printed circuit board traces.

15. The co-packaged, multiplane network of claim 11, wherein the network is at least a part of a mesh network or a ring network.

* * * * *